(12) United States Patent  
Borys et al.

(10) Patent No.: US 12,380,583 B2
(45) Date of Patent: Aug. 5, 2025

(54) CONTINUOUS SURFACE AND DEPTH ESTIMATION

(71) Applicant: Snap Inc., Santa Monica, CA (US)

(72) Inventors: Olha Borys, Vienna (AT); Ilteris Kaan Canberk, Marina Del Rey, CA (US); Daniel Wagner, Vienna (AT); Jakob Zillner, Absdorf (AT)

(73) Assignee: SNAP INC., Santa Monica, CA (US)

( * ) Notice: Subject to any disclaimer, the term of this patent is extended or adjusted under 35 U.S.C. 154(b) by 2 days.

(21) Appl. No.: 18/435,797

(22) Filed: Feb. 7, 2024

(65) Prior Publication Data

US 2024/0177328 A1  May 30, 2024

Related U.S. Application Data

(63) Continuation of application No. 17/747,592, filed on May 18, 2022, now Pat. No. 11,961,251.

(60) Provisional application No. 63/190,140, filed on May 18, 2021.

(51) Int. Cl.
*H04N 13/128* (2018.01)
*G06T 7/593* (2017.01)
*G06T 7/73* (2017.01)
*G06T 15/00* (2011.01)
*H04N 13/204* (2018.01)
*H04N 13/00* (2018.01)

(52) U.S. Cl.
CPC ............ *G06T 7/593* (2017.01); *G06T 7/73* (2017.01); *G06T 15/00* (2013.01); *H04N 13/128* (2018.05); *H04N 13/204* (2018.05); *G06T 2207/10012* (2013.01); *H04N 2013/0081* (2013.01)

(58) Field of Classification Search
CPC .......... G06T 7/593; G06T 7/73; G06T 15/00; H04N 13/204; H04N 13/128
USPC ............................................................ 348/47
See application file for complete search history.

(56) References Cited

U.S. PATENT DOCUMENTS

| | | | |
|---|---|---|---|
| 7,162,054 | B2 | 1/2007 | Meisner et al. |
| 11,126,881 | B2 | 9/2021 | Masci |
| 2016/0086322 | A1 | 3/2016 | Arita et al. |
| 2017/0039731 | A1 | 2/2017 | Liu et al. |
| 2020/0302681 | A1 | 9/2020 | Totty et al. |
| 2021/0398306 | A1 | 12/2021 | Bleyer et al. |
| 2022/0375112 | A1 | 11/2022 | Borys et al. |
| 2022/0377306 | A1 | 11/2022 | Borys et al. |

FOREIGN PATENT DOCUMENTS

| | | |
|---|---|---|
| CN | 117321633 A | 12/2023 |
| WO | WO-2022245961 A1 | 11/2022 |

OTHER PUBLICATIONS

"U.S. Appl. No. 17/747,592, Non Final Office Action mailed Oct. 5, 2023", 11 pgs.
"U.S. Appl. No. 17/747,592, Notice of Allowance mailed Nov. 29, 2023", 8 pgs.

(Continued)

*Primary Examiner* — Nguyen T Truong
(74) *Attorney, Agent, or Firm* — SCHWEGMAN LUNDBERG & WOESSNER, P.A.

(57) ABSTRACT

Disclosed are systems, methods, and non-transitory computer-readable media for continuous surface and depth estimation. A continuous surface and depth estimation system determines the depth and surface normal of physical objects by using stereo vision limited within a predetermined window.

20 Claims, 6 Drawing Sheets

(56) References Cited

OTHER PUBLICATIONS

"U.S. Appl. No. 17/747,592, Response filed Nov. 14, 2023 to Non Final Office Action mailed Oct. 5, 2023", 11 pgs.
"International Application Serial No. PCT/US2022/029855, International Preliminary Report on Patentability mailed Nov. 30, 2023", 7 pgs.
"International Application Serial No. PCT/US2022/029855, International Search Report mailed Aug. 24, 2022", 5 pgs.
"International Application Serial No. PCT/US2022/029855, Written Opinion mailed Aug. 24, 2022", 5 pgs.
Jabalemeli, Amirhossein, et al., "From Single 2D Depth Image to Gripper 6D Pose Estimation: A Fast and Robust Algorithm for Grabbing Objects in Cluttered Scenes", Robotics, 8(63), (2019), 24 pgs.
Nguyen, Thanh, et al., "Structural Modeling from Depth Image", IEEE Transactions on Visualization and Computer Graphics, vol. 21, No. 11, (Nov. 15, 2015), 1230-1240.
Schenk, Fabian, et al., "Robust Edge-based Visual Odometry using Machine-Learned Edges", IEEE/RSJ International Conference on Intelligent Robots and Systems (IROS), (2017), 8 pgs.

CONTINUOUS SURFACE AND DEPTH ESTIMATION

RELATED APPLICATIONS

This patent application is a continuation of U.S. patent application Ser. No. 17/747,592, filed May 18, 2022, which patent application claims the benefit of priority to U.S. Application Ser. No. 63/190,140, filed May 18, 2021, which is incorporated by reference herein in its entirety.

TECHNICAL FIELD

An embodiment of the present subject matter relates generally to computer vision and, more specifically, to continuous surface and depth estimation.

BACKGROUND

Augmented Reality (AR) provides a digitally enhanced experience in which digital content is used to augment a user's real-world environment. For example, virtual content may provide the user with data describing the user's surrounding physical environment, such as presenting data describing nearby businesses, providing directions, displaying weather information, and the like. To create the illusion that the virtual content physically exists in the real-world, the virtual content is displayed to the user based on the distance and orientation of the physical objects in the user's real-world environment. For example, the virtual content may be presented to appear overlaid or adjacent to real world objects related to the virtual content.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
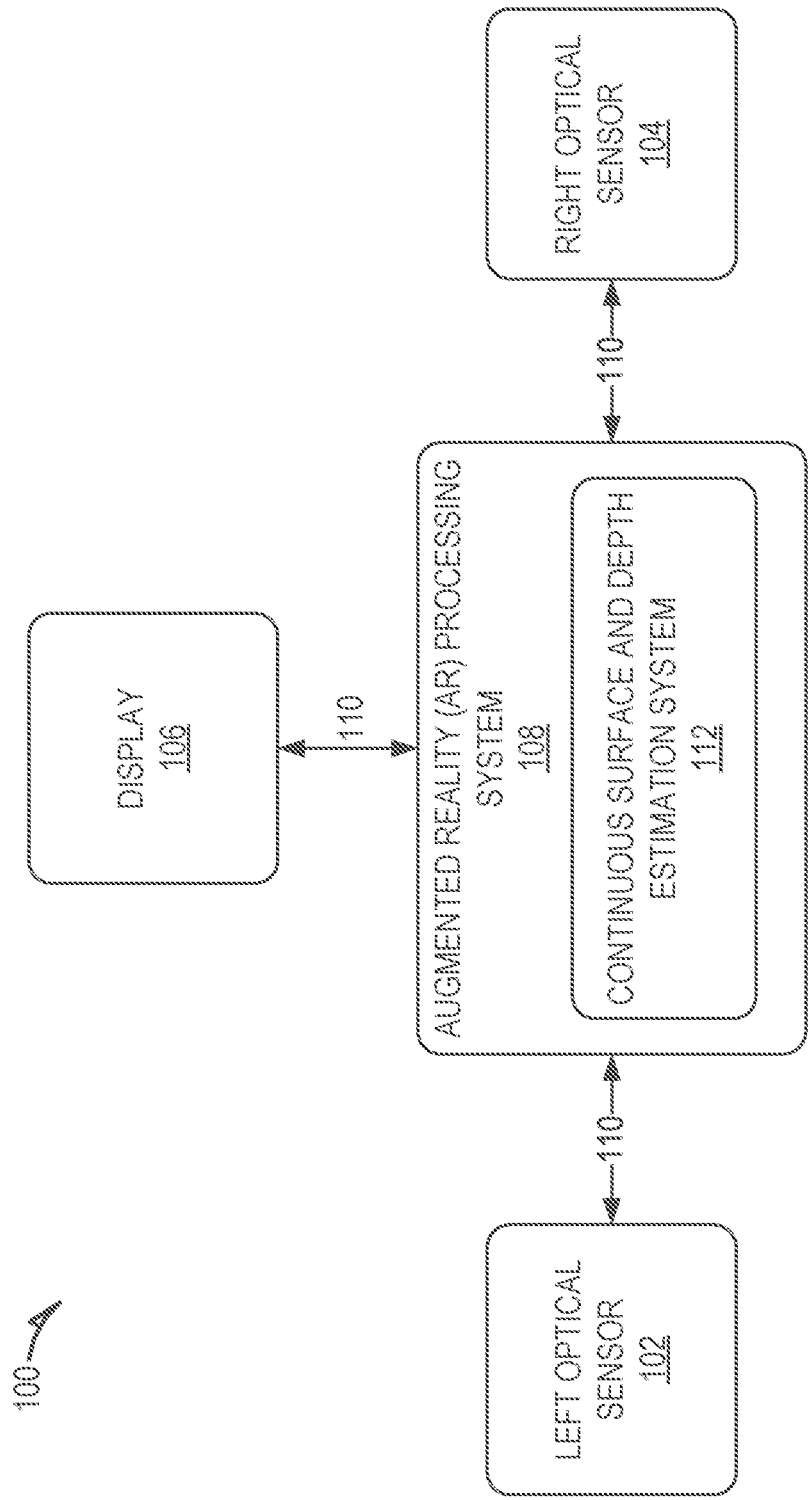
FIG. 1 shows a block diagram of a system for continuous surface and depth estimation, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

Knowledge about the physical environment is a key element of an AR application. One of the most fundamental ways to gain knowledge about the surrounding physical environment is to estimate the structure of nearby surfaces and objects. Current techniques for doing so are computationally expensive and/or require special hardware and sensors such as depth sensors which consume additional power. AR devices, however, are preferably designed to be small in size to allow for their easy use by users and may therefore have limited available computing hardware and sensors.

Disclosed are systems, methods, and non-transitory computer-readable media for continuous surface and depth estimation. A continuous surface and depth estimation system determines the depth and surface normal of physical objects. As explained earlier, current techniques for determining the depth of objects are computationally expensive and/or require special hardware and sensors such as depth sensors which consume additional power. The continuous surface and depth estimation system alleviates these issues by using stereo vision limited within a predetermined window.

Unlike techniques that rely on depth sensors, stereo vision allows for the extraction of three-dimensional information from digital images. To utilize stereo vision, two optical sensors are displaced at known locations from one another and used to capture overlapping images depicting two differing views of the real-world environment from two different vantage points. The relative depth of the objects captured in the images is determined by comparing the relative positions of the objects in the two images. For example, the known distance between the two optical sensors and the known vantage points of the of the two optical sensors can be used along with the relative positions of the objects in the captured images to estimate the depth of the objects using triangulation.

To further reduce computing resource consumption, the continuous surface and depth estimation system limits the use of stereo vision to a predetermined window within the images captured by optical sensors. For example, the predetermined window may be a sub-portion of the images that is in the center of the images captured by the optical sensors. Limiting use of stereo vision to the predetermined window allows for stereo vision to be used with limited computing resources.

The continuous surface and depth estimation system uses stereo vision to identify a set of matching features in a pair of corresponding images captured by the optical sensors. The matching features are recognizable points (e.g., distinctive areas) of a physical object in the real-world environment, such as corners, edges, and the like. The continuous surface and depth estimation system identifies features within the predetermined window of one of the images and then searches for the same features in the corresponding image.

The continuous surface and depth estimation system determines a depth value for each pair of matching features that was identified in each of the corresponding images. For example, the continuous surface and depth estimation system uses the location of the features in the images, along with the known orientation of the optical sensors (e.g., distance between the optical sensors and vantage points of the optical sensors) to triangulate the depth of the features. The resulting set of depth values is then used to estimate a surface plane indicating the depth and surface normal of a surface of a physical object. For example, the continuous surface and depth estimation system uses methods such as Random Sample Consensus (RANSAC) to determine the surface plane of the object.

In some cases, the continuous surface and depth estimation system may not be able to identify a sufficient number of matching features within a pair of corresponding images to determine a surface plane for the object. In these types of situations, the continuous surface and depth estimation system may estimate the depth of the object based on the matching features that are available and utilize the surface normal from a previous set of corresponding images to determine the surface plane. If the number of matching features is insufficient to determine even the depth of the object (e.g., no matching features are identified), the continuous surface and depth estimation system may use ray casting to determine the surface plane. For example, the continuous surface and depth estimation system may cast a ray towards a previously known surface plane (e.g., the last known surface plane) to determine the depth of the object.

In certain embodiments, an AR device may be configured to render augmentations (i.e., media content) at a relatively high frame rate, while a corresponding sensor data (i.e., image data generated by optical sensors), are provided at a lower frame rate. To address this, a position of the estimated surface plane may be predicted forward for every subsequent frame rendered by the system in order to account for the unavailable data. As an illustrative example, if the rendering frame rate applied by the AR device is at 60 Hz, but the images are only provided by the optical sensors at a rate of 30 Hz, then the position of the estimated surface plane may be predicted forward for every subsequent frame rendered by the system by propagating the previously known surface plane forward (e.g., by using a Kalman filter or a Double Exponential Smoothing filter).

FIG. 1 shows a block diagram of an AR device 100 for continuous surface and depth estimation, according to some example embodiments. The AR device 100 provides functionality to augment the real-world environment of a user. For example, the AR device 100 allows for a user to view real-world objects in the user's physical environment along with virtual content to augment the user's environment. The virtual content may provide the user with data describing the user's surrounding physical environment, such as presenting data describing nearby businesses, providing directions, displaying weather information, and the like.

The virtual content may be presented to the user based on the distance and orientation of the physical objects in the user's real-world environment. For example, the virtual content may be presented to appear overlaid on a surface of a real-world object. As an example, virtual content describing a recipe may be presented to appear overlaid over the surface of a kitchen counter. As another example, virtual content providing directions to a destination may be presented to appear overlaid on the surface of a path (e.g., street, ground) that the user is to follow to reach the destination.

In some embodiments, the AR device 100 may be a mobile device, such as a smartphone or tablet, that presents real-time images of the user's physical environment along with virtual content. Alternatively, the AR device 100 may be a wearable device, such as a helmet or glasses, that allows for presentation of virtual content in the line of sight of the user, thereby allowing the user to view both the virtual content and the real-world environment simultaneously.

As shown, the AR device 100 includes a left optical sensor 102, a right optical sensor 104, and a display 106 connected to and configured to communicate with an AR processing system 108 via communication links 110. The communication links 110 may be either physical or wireless. For example, the communication links 110 may be comprised of physical wires or cables connecting the left optical sensor 102 the right optical sensor 104, and the display 106 to the AR processing system 108. Alternatively, the communication links 110 may be wireless links facilitated through use of a wireless communication protocol, such as BLUETOOTH.

Each of the left optical sensor 102, the right optical sensor 104, the display 106 and the AR processing system 108 may be comprised of one or more devices capable of network communication with other devices. For example, each device can include some or all of the features, components, and peripherals of the machine 500 shown in FIG. 5.

To facilitate communication with other device, each device includes a communication interface configured to receive a communication, such as a request, data, and the like, from another device in communication with the device and pass the communication along to an appropriate module or component running on the device. The communication interface also sends communications to the other devices in communication with the device.

The left optical sensor 102 and right optical sensor 104 may be any type of sensor capable of capturing image data. For example, the left optical sensor 102 and the right optical sensor 104 may be cameras configured to capture images and/or video. The images captured by the left optical sensor 102 and the right optical sensor 104 are provided to the AR processing system 108 via the communication links 108.

To allow for use of stereo vison, the left optical sensor 102 and the right optical sensor 104 are displaced at a known distance from one another to capture overlapping images depicting two differing views of the real-world environment from two different vantage points. The orientation of the optical sensors 102, 104 within the AR device 100 is calibrated to provide a known image transformation between the two optical sensors 102, 104. The image transformation is a function that maps the location of a pixel in one image to the corresponding location of the pixel in the corresponding image.

For the image transformation to properly map the location of pixels between the images, the optical sensors 102, 104 are positioned at a predetermined distance from each other and aligned to capture a specific vantage point. The vantage point of each optical sensor 102, 104 indicates the field of view and focal point captured by the optical sensor 102, 104. The known distance between the optical sensors 102, 104 and the known vantage point of each optical sensor 102, 104 can be used to calculate the transformation between images captured by each of the optical sensors 102, 104.

The display 106 may be any of a variety of types of displays capable of presenting virtual content. For example, the display 106 may be a monitor or screen upon which virtual content may be presented simultaneously with images of the user's physical environment. Alternatively, the display 106 may be a transparent display that allows the user to view virtual content being presented by the display 106 in conjunction with real world objects that are present in the user's line of sight through the display 106.

The AR processing system 108 is configured to provide AR functionality to augment the real-world environment of the user. For example, the AR processing system 108 generates and causes presentation of virtual content on the display 106 based on the physical location of the surrounding real-world objects to augment the real-world environment of the user. The AR processing system 108 presents the virtual content on the display in a manner to create the illusion that the virtual content is overlaid on a physical object. For example, the AR processing system 108 may generate the virtual content based on a determined surface plane that indicates the depth and surface normal of a surface of a physical object. The depth indicates the distance of the object from the AR device 100 and the surface normal is a vector that is perpendicular to the surface of the object at a particular point. The AR processing system 108 uses the surface plane to generate and cause presentation of the virtual content to create the illusion that the virtual content is overlaid on the surface of the object.

As explained earlier, current techniques for determining the depth and surface normal of objects are computationally expensive and/or require special hardware and sensors, such as depth sensors, that consume additional power. The AR processing system 108 alleviates these issues through use of the continuous surface and depth estimation system 112. The continuous surface and depth estimation system 112 determines a surface plane of an object using stereo vision within a limited predetermined window of images.

Unlike techniques that rely on depth sensors, stereo vision allows for the extraction of three-dimensional information from digital images. For example, the two optical sensors 102, 104 are used to capture a pair of corresponding images depicting two differing views of the real-world environment from two different vantage points. The continuous surface and depth estimation system 112 determines the relative depth of objects captured in the images by comparing the relative positions of the objects in the two images. For example, the known distance between the two optical sensors 102, 104 and the known vantage points of the of the two optical sensors 102, 104 can be used along with the relative positions of the objects in the captured images to estimate the depth of the objects using triangulation.

To further reduce computing resource consumption, the continuous surface and depth estimation system 112 limits the use of stereo vision to a predetermined window within the images captured by optical sensors 102, 104. For example, the predetermined window may be a sub-portion of the images that is in the center of the images captured by the optical sensors 102, 104. Accordingly, the continuous surface and depth estimation system 112 focuses its functionality to objects that are captured within the predetermined window and may not identify features or objects that are not present with the predetermined window.

To accomplish this, the continuous surface and depth estimation system 112 identifies a set of matching features in a pair of corresponding images captured by the optical sensors 102, 104. The matching features are recognizable points of a physical object in the real-world environment, such as corners, edges, and the like. The continuous surface and depth estimation system 112 initially identifies features within the predetermined window of one of the images (e.g., the image captured by the left optical sensors 102) and then searches for the same features in the corresponding image (e.g., the image captured by the right optical sensor 104).

The continuous surface and depth estimation system 112 determines depth values for each pair of matching features that was identified in each of the corresponding images. For example, the continuous surface and depth estimation system 112 uses the location of the features in the images, along with the known orientation of the optical sensors 102, 104 (e.g., distance between and vantage points) to triangulate the depth of the features. The resulting set of depth values is then used to estimate a surface plane indicating the depth and surface normal of a surface of the physical object. For example, the continuous surface and depth estimation system 112 uses methods such as Random Sample Consensus (RANSAC) to determine the surface plane of the object.

In some cases, the continuous surface and depth estimation system 112 may not be able to identify a sufficient number of matching features within a pair of corresponding images to determine a surface plane for the object. In these types of situations, the continuous surface and depth estimation system 112 may estimate the depth of the object based on the matching features that are available and utilize the surface normal from a previous set of corresponding images to determine the surface plane. If the number of matching features is insufficient to determine even the depth of the object, the continuous surface and depth estimation system 112 may use ray casting to determine the surface plane. For example, the continuous surface and depth estimation system 112 may cast a ray towards a previously known surface plane of the object (e.g., the last know surface plane) to determine the depth of the object.

The continuous surface and depth estimation system 112 provides data defining the determined surface plane to the AR processing system 108. In turn, the AR processing system 108 may use the determined surface plane to generate and present virtual content that appears to be overlaid on the surface of the object.

Figure 2:
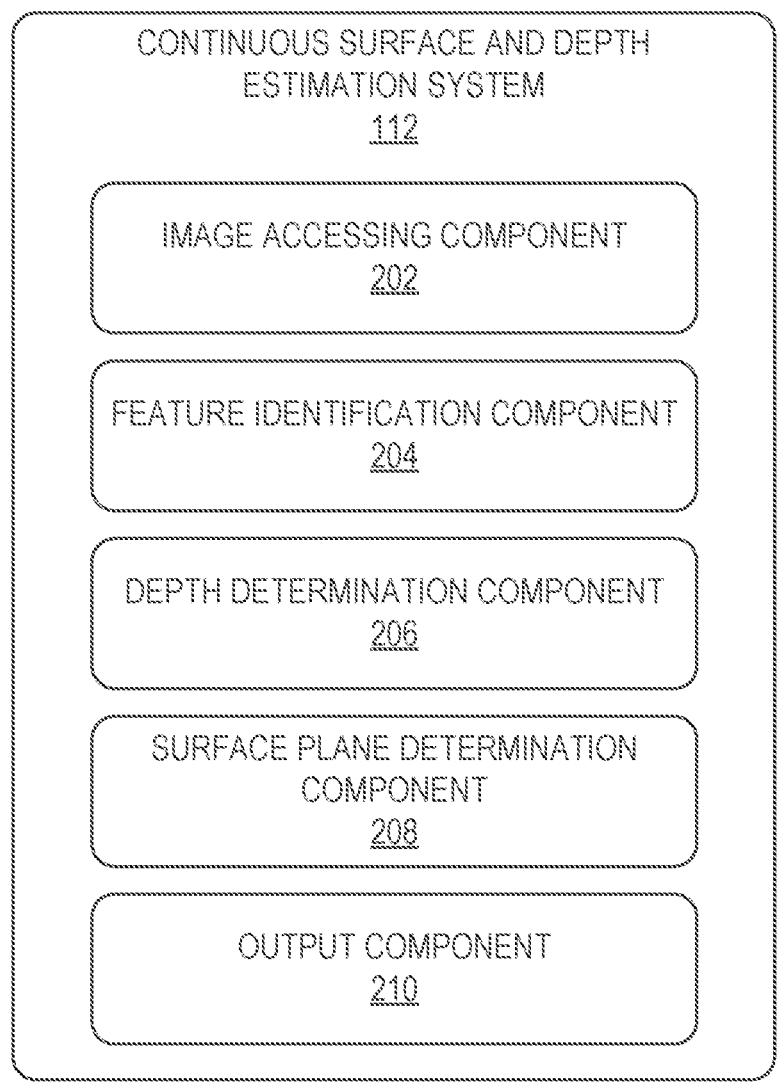
FIG. 2 is a block diagram of a continuous surface and depth estimation system, according to some example embodiments.

FIG. 2 is a block diagram of a continuous surface and depth estimation system 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the continuous surface and depth estimation system 112 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the continuous surface and depth estimation system 112 includes an image accessing component 202, a feature identification component 204, a depth determination component 206, a surface plane determination component 208, and an output component 210.

The image accessing component 202 accesses corresponding images captured by the left optical sensor 102 and the right optical sensor 104. Corresponding images are a pair of two images that were captured by the two optical sensors 102, 104 at approximately the same time. The corresponding images captured by the optical sensors 102, 104 can be used to determine the depth of objects using stereo vision. To utilize stereo vision, the two optical sensors 102, 104 are displaced horizontally from one another and used to capture images depicting two differing views of the real-world environment from two different vantage points. The corresponding images accessed by the image accessing component 202 depict the physical environment of the AR device 100 from the vantage point of the optical sensor 102, 104 that captured the respective image. For example, the image that was captured by the left optical sensor 102 depicts the physical environment from the vantage point of the left optical sensor 102, and the image that was captured by the right optical sensor 104 depicts the physical environment from the vantage point of the left optical sensor 104.

The image accessing component 202 may access the corresponding images from the left optical sensor 102 and right optical sensor 104 directly or via the AR processing system 108. For example, the left optical sensor 102 and right optical sensor 104 may provide the image accessing component 202 with the images directly using the communication links 110. As another example, the left optical sensor 102 and right optical sensor 104 may provide the images to the AR processing system 108 and the AR processing system 108 then provides the images to the image accessing component 202 or stores the images in a memory from which they may be accessed by the image accessing component 202. The image accessing component 202 provides the accessed corresponding images to the other components of the continuous surface and depth estimation system 112.

The feature identification component 204 identifies matching features in a pair of corresponding images. A feature is an identifiable portion or component of an image. Examples of features that may be identified in an image include an edge, corner, point of interest, blob, ridge, and the like. Matching features in the two images are features identified in each image that are determined to be the same feature. For example, the matching features may be an edge or corner identified in each image that are determined to depict the same portion of the real-world environment depicted in the images.

The feature identification component 204 identifies features using any of a variety of known feature detection techniques or algorithms for image processing. For example, the feature identification component 204 may use techniques that identify features based on identified contrasts in nearby pixels and/or patterns in the images.

The feature identification component 204 initially identifies multiple features within a predetermined window of one of the images. The predetermined window may be a sub-portion of the image. For example, the predetermined window may be a portion that is in the center of the image captured by an optical sensor 102, 104. The feature identification component 204 identifies features in the predetermined window within one of the images (e.g., the image captured by the left optical sensor 102) and then attempts to find the matching features in the corresponding image (e.g., the image captured by the right optical sensor 104). For example, the feature identification component 204 may utilize the transformation function to identify the matching feature in the corresponding image. The feature identification component 204 may compare features identified in each of the two images to determine whether the features are matching. For example, the feature identification component 204 may analyze pixels depicting each feature based on color, patterns, and the like, to determine whether the two features are matching.

The feature identification component 204 provides data identifying the set of matching features to the other components of the continuous surface and depth estimation system 112. For example, the data may include location data describing a relative location of the features in each image. This may include coordinates describing the location of the pixels in each image that depict the matching features, data identifying the optical sensor (e.g., left optical sensor 102 or right optical sensor 104) that captured each feature, the time at which the features were captured, and the like.

The depth determination component 206 determines depth values indicating the depth of the matching features identified by the feature identification component 204. The depth determination component 206 determines the depth values using stereo vision. For example, the depth value for each matching feature is determined using triangulation by comparing the relative positions of the matching features in the two images. For example, the positions of the matching features in each image are used along with the known orientation of the optical sensors 102, 104 (e.g., distance between the optical sensors 102, 104, vantage points the optical sensors 102, 104) to determine the depth value for the matching features. The depth value indicates the depth of the physical feature of the object from the AR device 100.

The depth determination component 206 provides the resulting set of depth values to the surface plane determination component 208. The surface plane determination component 208 uses the set of depth values to estimate a surface plane indicating the depth and surface normal of a surface of the physical object. For example, the surface plane determination component 208 uses methods such as Random Sample Consensus (RANSAC) to determine the surface plane of the object.

In some cases, there may not be a sufficient number of matching features for the surface plane determination component 208 to determine the surface plane of the physical object. For example, a limited number of matching features (e.g., less than three) may have been identified by the feature identification component 204 in a pair of corresponding images. In these types of situations, the surface plane determination component 208 may estimate the depth of the object based on the matching features that are available (e.g., based on the depth values determined by the depth determination component 206 from the pair of corresponding images) and utilize the surface normal from a previous set of corresponding images to determine the surface plane. If the number of matching features is insufficient to even determine the depth of the object, the surface plane determination component 208 may use ray casting to determine the surface plane. For example, the surface plane determination component 208 may cast a ray towards a previously known surface plane (e.g., the last known surface plane) to determine the depth of the object.

The output component 210 provides data defining the determined surface plane to the AR processing system 108. In turn, the AR processing system 108 may use the determined surface plane to generate and present virtual content that appears to be overlaid on the surface of the object.

Figure 3A:
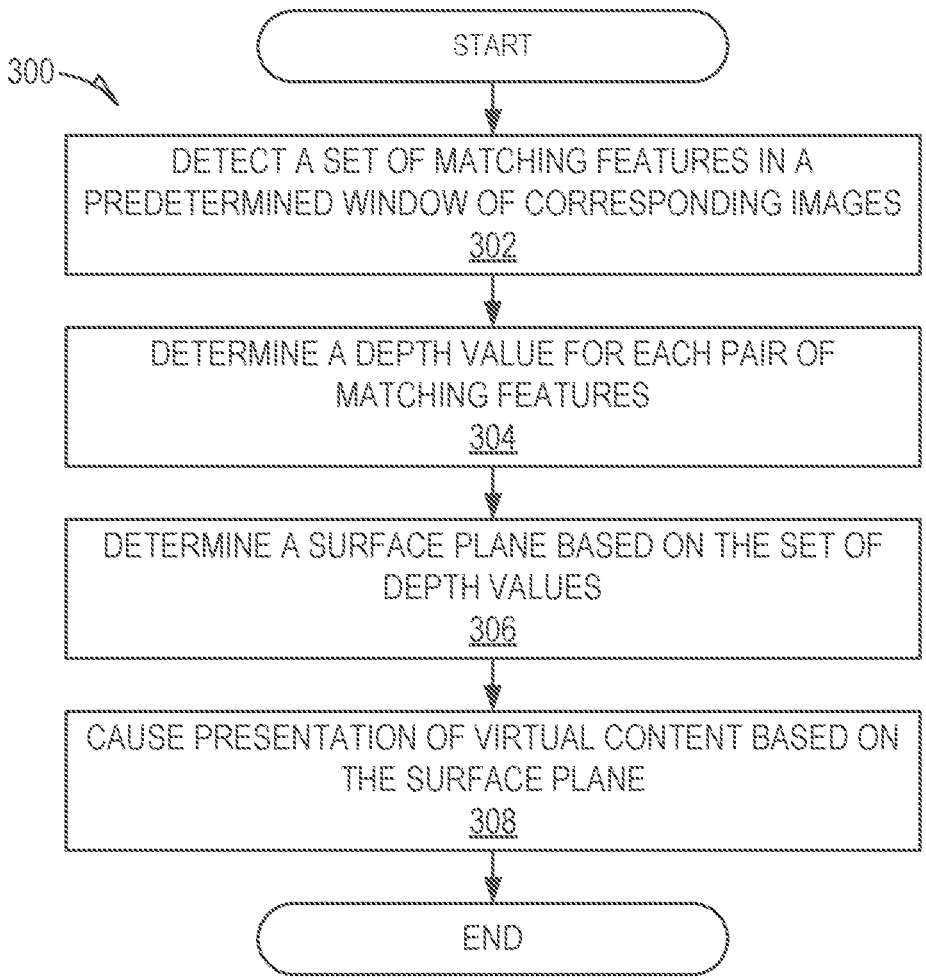
FIGS. 3A & 3B are flow diagrams of methods for continuous surface and depth estimation, according to some example embodiments.
Figure 3B:
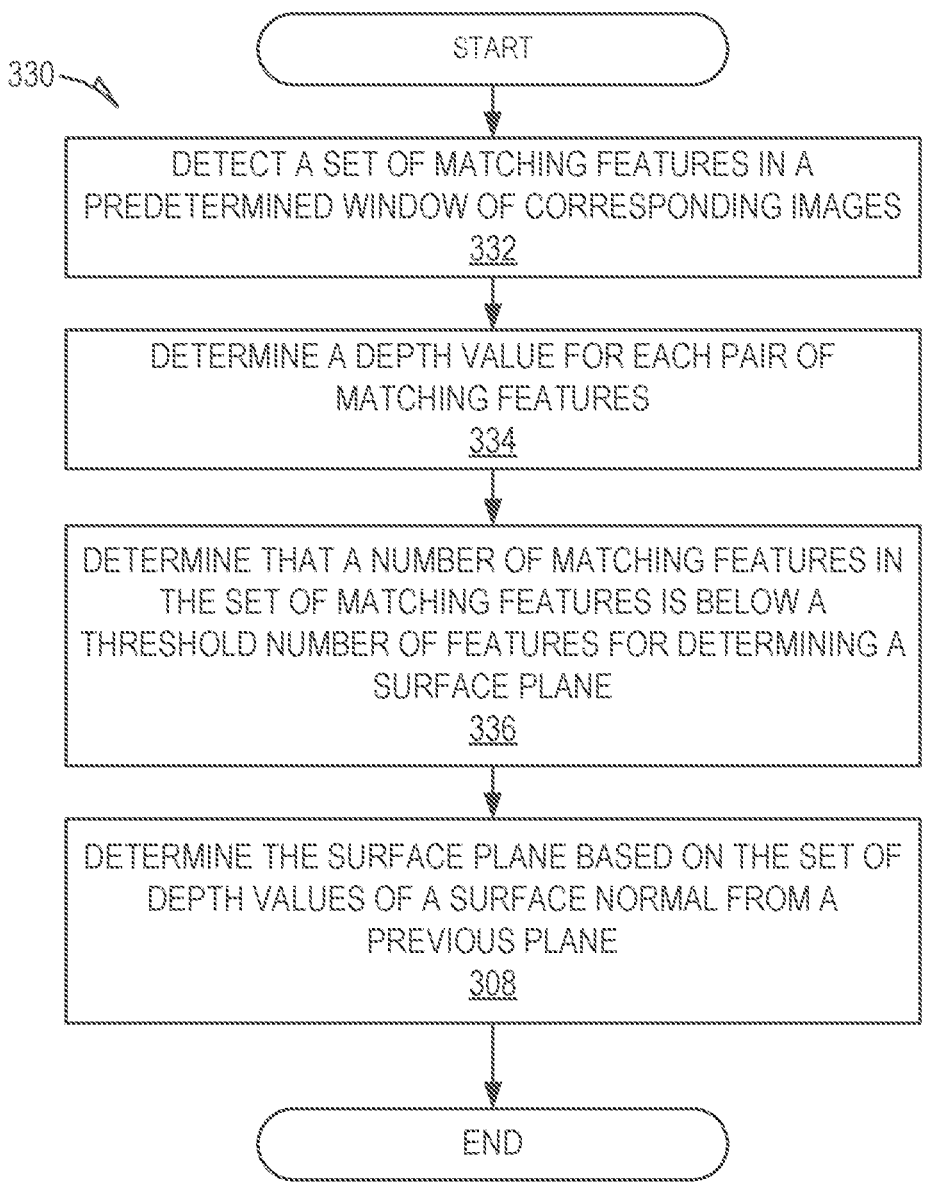

FIGS. 3A and 3B are flow diagrams of methods for continuous surface and depth estimation, according to some example embodiments The methods 300, 330 may be embodied in computer readable instructions for execution by one or more computer processors such that the operations of the methods 300, 330 may be performed in part or in whole by the continuous surface and depth estimation system 112; accordingly, the methods 300, 330 are described below by way of example with reference to the continuous surface and depth estimation system 112. However, it shall be appreciated that at least some of the operations of the methods 300, 330 may be deployed on various other hardware and/or software configurations and the methods 300, 330 are not intended to be limited to the continuous surface and depth estimation system 112.

FIG. 3A shows a method 300 for continuous surface and depth estimation. At operation 302, the feature identification component 204 detects a set of matching features in a predetermined window of corresponding images. A feature is an identifiable portion or component of an image. Examples of features that may be identified in an image include an edge, corner, point of interest, blob, ridge, and the like. Matching features in the two images are features identified in each image that are determined to be the same feature. For example, the matching features may be an edge or corner identified in each image that are determined to depict the same portion of the real-world environment depicted in the images.

The feature identification component 204 identifies features using any of a variety of known feature detection techniques or algorithms for image processing. For example, the feature identification component 204 may use techniques that identify features based on identified contrasts in nearby pixels and/or patterns in the images.

The feature identification component 204 initially identifies multiple features within a predetermined window of one of the images. The predetermined window may be a sub-portion of the image. For example, the predetermined window may be a portion that is in the center of the image captured by an optical sensor 102, 104. The feature identification component 204 identifies features in the predetermined window within one of the images (e.g., the image captured by the left optical sensor 102) and then attempts to find the matching features in the corresponding image (e.g., the image captured by the right optical sensor 104). For example, the feature identification component 204 may utilize the transformation function to identify the matching feature in the corresponding image. The feature identification component 204 may compare features identified in each of the two images to determine whether the features are matching. For example, the feature identification component 204 may analyze pixels depicting each feature based on color, patterns, and the like, to determine whether the two features are matching.

At operation 304, the depth determination component 206 determines a depth value for each pair of matching features. The depth determination component 206 determines the depth values using stereo vision. For example, the depth value for each matching feature is determined using triangulation by comparing the relative positions of the matching features in the two images. For example, the positions of the matching features in each image are used along with the known orientation of the optical sensors 102, 104 (e.g., distance between the optical sensors 102, 104, vantage points the optical sensors 102, 104) to determine the depth value for the matching features. The depth value indicates the depth of the physical feature of the object from the AR device 100.

At operation 306, the surface plane determination component 208 determines a surface plane based on the set of depth value. The surface plane determination component 208 uses the set of depth values to estimate a surface plane indicating the depth and surface normal of a surface of the physical object. For example, the surface plane determination component 208 uses methods such as Random Sample Consensus (RANSAC) to determine the surface plane of the object.

In some cases, there may not be a sufficient number of matching features for the surface plane determination component 208 to determine the surface plane of the object. In these types of situations, the surface plane determination component 208 may estimate the depth of the object based on the depth values determined for the matching features that are available and utilize the surface normal from a previous set of corresponding images to determine the surface plane. If the number of matching features is insufficient to determine even the depth of the object, the surface plane determination component 208 may use ray casting to determine the surface plane. For example, the surface plane determination component 208 may cast a ray towards the last known surface plane to determine the depth of the object.

At operation 308, the AR processing system 108 causes presentation of virtual content based on the surface plane. The AR processing system 108 is configured to provide AR functionality to augment the real-world environment of the user. For example, the AR processing system 108 generates and causes presentation of virtual content on the display 106 based on the physical location of the surrounding real-world objects to augment the real-world environment of the user. The AR processing system 108 presents the virtual content on the display in a manner to create the illusion that the virtual content is overlaid on a physical object. For example, the AR processing system 108 may generate the virtual content based on a determined surface plane that indicates the depth and surface normal of a surface of a physical object. The depth indicates the distance of the object from the AR device 100 and the surface normal is a vector that is perpendicular to the surface of the object at a particular point. The AR processing system 108 uses the surface plane to generate and cause presentation of the virtual content to create the illusion that the virtual content is overlaid on the surface of the object.

FIG. 3B shows a method 330 for continuous surface and depth estimation in a situation where there is an insufficient number of matching features for the surface plane determination component 208 to determine the surface plane of an object.

At operation 332, the feature identification component 204 detects a set of matching features in a predetermined window of corresponding images.

At operation 334, the depth determination component 206 determines a depth value for each pair of matching features.

At operation 336, the surface plane determination component 208 determines that a number of matching features in the set of matching features is below a threshold number of features for determining the surface plane. For example, the surface plane determination component 208 may require at least three matching features to accurately determine the surface plane of an object.

At operation 338, the surface plane determination component 208 determines the surface plane based on the set of depth values and a surface normal from a previous surface plane. The previous surface plane is a surface plane determined based on a set of matching features identified in a previously captured set of corresponding images.

Software Architecture

Figure 4:
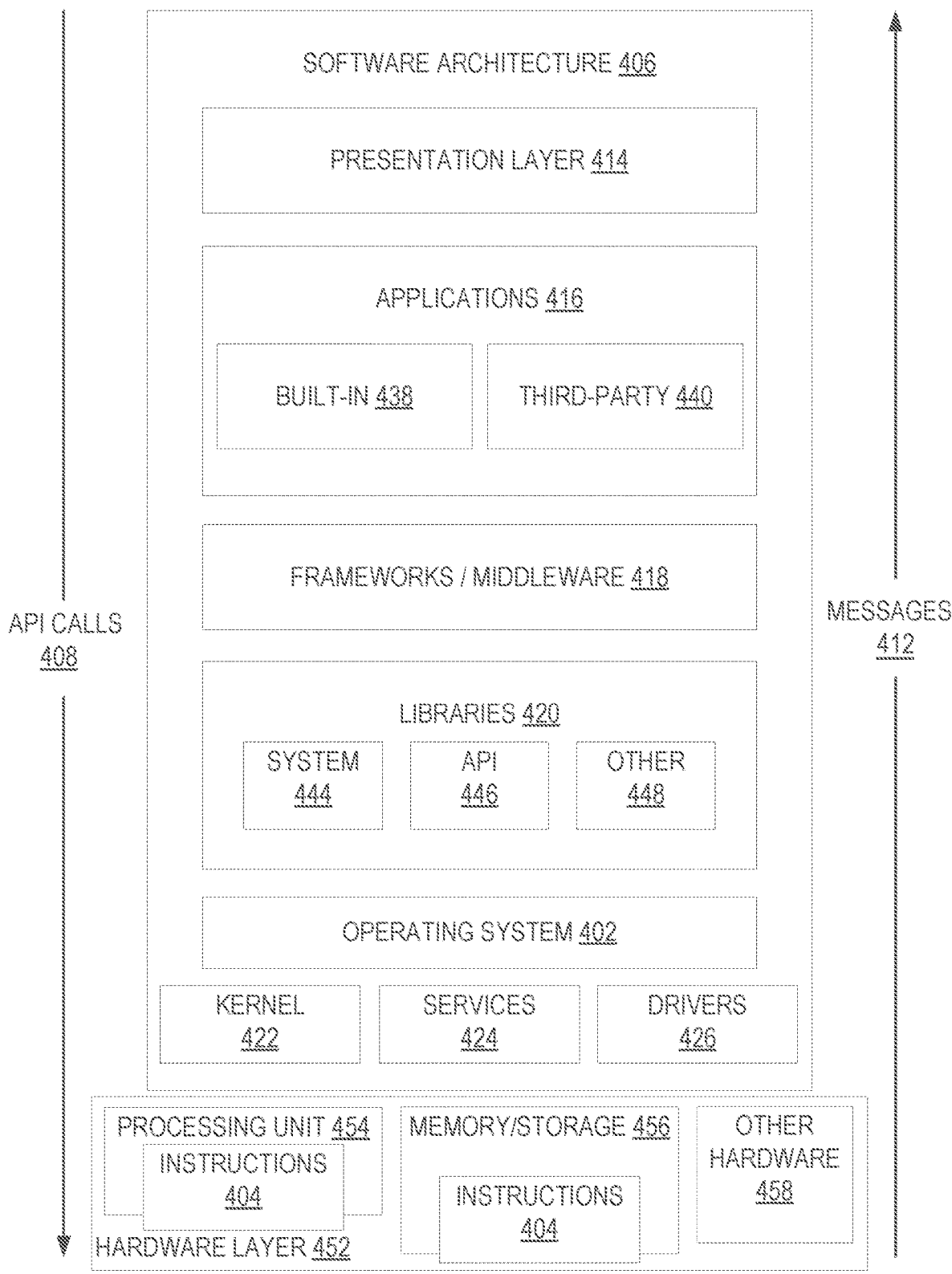
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating an example software architecture 406, which may be used in conjunction with various hardware architectures herein described. FIG. 4 is a non-limiting example of a software architecture 406 and it will be appreciated that many other architectures may be implemented to facilitate the functionality described herein. The software architecture 406 may execute on hardware such as machine 500 of FIG. 5 that includes, among other things, processors 504, memory 514, and (input/output) I/O components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components, and so forth described herein. The hardware layer 452 also includes memory and/or storage modules 456, which also have executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke application programming interface (API) calls 408 through the software stack and receive a response such as messages 412 in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 420 provide a common infrastructure that is used by the applications 416 and/or other components and/or layers. The libraries 420 provide functionality that allows other software components to perform tasks in an easier fashion than to interface directly with the underlying operating system 402 functionality (e.g., kernel 422, services 424, and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks/middleware 418 (also sometimes referred to as middleware) provide a higher-level common infrastructure that may be used by the applications 416 and/or other software components/modules. For example, the frameworks/middleware 418 may provide various graphical user interface (GUI) functions, high-level resource management, high-level location services, and so forth. The frameworks/middleware 418 may provide a broad spectrum of other APIs that may be used by the applications 416 and/or other software components/modules, some of which may be specific to a particular operating system 402 or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built in operating system functions (e.g., kernel 422, services 424, and/or drivers 426), libraries 420, and frameworks/middleware 418 to create UIs to interact with users of the system. Alternatively, or additionally, in some systems, interactions with a user may occur through a presentation layer, such as presentation layer 414. In these systems, the application/component "logic" can be separated from the aspects of the application/component that interact with a user.

Figure 5:
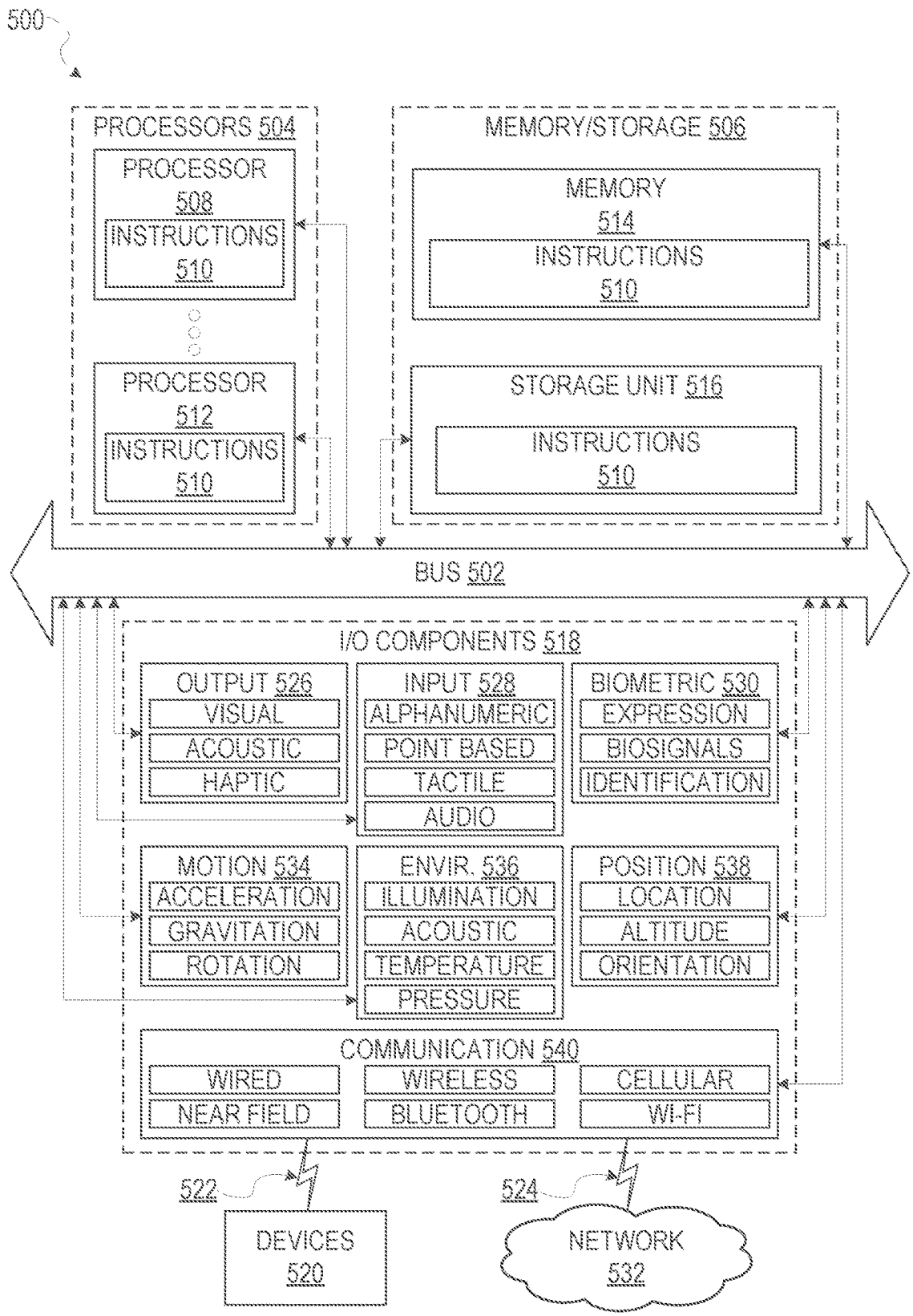
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions 404 from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions 510 may be used to implement modules or components described herein. The instructions 510 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 500 capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory/storage 506, and I/O components 518, which may be configured to communicate with each other such as via a bus 502. The memory/storage 506 may include a memory 514, such as a main memory, or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine 500 will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 518 may include biometric components 530, motion components 534, environmental components 536, or position components 538 among a wide array of other components. For example, the biometric components 530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via coupling 524 and coupling 522, respectively. For example, the communication components 540 may include a network interface component or other suitable device to interface with the network 532. In further examples, communication components 540 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a USB).

Moreover, the communication components 540 may detect identifiers or include components operable to detect identifiers. For example, the communication components 540 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 510 for execution by the machine 500, and includes digital or analog communications signals or other intangible medium to facilitate communication of such instructions 510. Instructions 510 may be transmitted or received over the network 532 using a transmission medium via a network interface device and using any one of a number of well-known transfer protocols.

"CLIENT DEVICE" in this context refers to any machine 500 that interfaces to a communications network 532 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 532.

"COMMUNICATIONS NETWORK" in this context refers to one or more portions of a network 532 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 532 or a portion of a network 532 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 510 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 510. The term "machine-readable medium" shall also be taken to include any medium, or combination of multiple media, that is capable of storing instructions 510 (e.g., code) for execution by a machine 500, such that the instructions 510, when executed by one or more computer processors 504 of the machine 500, cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 504) may be configured by software (e.g., an application 416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 504 or other programmable processor 504. Once configured by such software, hardware components become specific machines 500 (or specific components of a machine 500) uniquely tailored to perform the configured functions and are no longer general-purpose processors 504. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 504 configured by software to become a special-purpose processor, the general-purpose processor 504 may be configured as respectively different special-purpose processors (e.g., comprising different hardware components) at different times. Software accordingly configures a particular processor or processors 504, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 502) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more computer processors 504 that are temporarily configured (e.g., by software) or permanently configured to perform the relevant operations. Whether temporarily or permanently configured, such processors 504 may constitute processor-implemented components that operate to perform one or more operations or functions described herein. As used herein, "processor-implemented component" refers to a hardware component implemented using one or more computer processors 504. Similarly, the methods described herein may be at least partially processor-implemented, with a particular processor or processors 504 being an example of hardware. For example, at least some of the operations of a method may be performed by one or more computer processors 504 or processor-implemented components. Moreover, the one or more computer processors 504 may also operate to support performance of the relevant operations in a "cloud computing" environment or as a "software as a service" (SaaS). For example, at least some of the operations may be performed by a group of computers (as examples of machines 500 including processors 504), with these operations being accessible via a network 532 (e.g., the Internet) and via one or more appropriate interfaces (e.g., an API). The performance of certain of the operations may be distributed among the processors 504, not only residing within a single machine 500, but deployed across a number of machines 500. In some example embodiments, the processors 504 or processor-implemented components may be located in a single geographic location (e.g., within a home environment, an office environment, or a server farm). In other example embodiments, the processors 504 or processor-implemented components may be distributed across a number of geographic locations.

"PROCESSOR" in this context refers to any circuit or virtual circuit (a physical circuit emulated by logic executing on an actual processor 504) that manipulates data values according to control signals (e.g., "commands," "op codes," "machine code," etc.) and which produces corresponding output signals that are applied to operate a machine 500. A processor 504 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 504 may further be a multi-core processor having two or more independent processors 504 (sometimes referred to as "cores") that may execute instructions 510 contemporaneously.

What is claimed is:

1. A method comprising:
   detecting a number of matching features within a first image and a second image that depict an object;
   determining the number of matching features is below a threshold value;
   identifying a known surface plane responsive to the determining that the number of matching features is below the threshold value;
   performing ray casting upon the known surface plane;
   determining a depth value for the object based on the ray casting; and
   causing presentation of media content based on the depth value.

2. The method of claim 1, wherein the detecting the number of matching features within the first image and the second image includes:
   detecting the set of matching features within a predetermined window of the first image and the second image, the set of matching features comprising a first feature depicted within the predetermined window of the first image, and a second feature depicted within the predetermined window of the second image.

3. The method of claim 2, wherein the predetermined window corresponds with a sub-portion of the first image and the second image.

4. The method of claim 2, wherein the predetermined window is a center portion of the first image and the second image.

5. The method of claim 1, wherein the media content includes Augmented-Reality (AR) content.

6. The method of claim 1, wherein the known surface plane includes a previous surface plane determined based on a set of matching features in a pair of images.

7. The method of claim 1, wherein the first image captured by a first optical sensor and the second image captured by a second optical sensor.

8. A system comprising:
   one or more computer processors; and
   one or more computer readable mediums storing instructions that, when executed by the one or more computer processors, causes the system to perform operations comprising:
   detecting a number of matching features within a first image and a second image that depict an object;
   determining the number of matching features is below a threshold value;
   identifying a known surface plane responsive to the determining that the number of matching features is below the threshold value;
   performing ray casting upon the known surface plane;
   determining a depth value for the object based on the ray casting; and causing presentation of media content based on the depth value.

9. The system of claim 8, wherein the detecting the number of matching features within the first image and the second image includes:
  detecting the set of matching features within a predetermined window of the first image and the second image, the set of matching features comprising a first feature depicted within the predetermined window of the first image, and a second feature depicted within the predetermined window of the second image.

10. The system of claim 9, wherein the predetermined window corresponds with a sub-portion of the first image and the second image.

11. The system of claim 9, wherein the predetermined window is a center portion of the first image and the second image.

12. The system of claim 8, wherein the media content includes Augmented-Reality (AR) content.

13. The system of claim 8, wherein the known surface plane includes a previous surface plane determined based on a set of matching features in a pair of images.

14. The system of claim 8, wherein the first image captured by a first optical sensor and the second image captured by a second optical sensor.

15. A non-transitory machine-readable storage medium comprising instructions that, when executed by one or more processors of one or more computing devices, cause the one or more computing devices to perform operations comprising:
  detecting a number of matching features within a first image and a second image that depict an object;
  determining the number of matching features is below a threshold value;
  identifying a known surface plane responsive to the determining that the number of matching features is below the threshold value;
  performing ray casting upon the known surface plane;
  determining a depth value for the object based on the ray casting; and
  causing presentation of media content based on the depth value.

16. The non-transitory machine-readable storage medium of claim 15, wherein the detecting the number of matching features within the first image and the second image includes:
  detecting the set of matching features within a predetermined window of the first image and the second image, the set of matching features comprising a first feature depicted within the predetermined window of the first image, and a second feature depicted within the predetermined window of the second image.

17. The non-transitory machine-readable storage medium of claim 16, wherein the predetermined window corresponds with a sub-portion of the first image and the second image.

18. The non-transitory machine-readable storage medium of claim 16, wherein the predetermined window is a center portion of the first image and the second image.

19. The non-transitory machine-readable storage medium of claim 15, wherein the media content includes Augmented-Reality (AR) content.

20. The non-transitory machine-readable storage medium of claim 15, wherein the known surface plane includes a previous surface plane determined based on a set of matching features in a pair of images.

* * * * *